Feb. 7, 1928.

J. KIRNER 1,658,530

JOURNALING OF SUPPORTING ROLLERS

Filed July 22, 1922

INVENTOR:
Josef Kirner by Wilhelm
Attorney.

Patented Feb. 7, 1928.

1,658,530

UNITED STATES PATENT OFFICE.

JOSEF KIRNER, OF STUTTGART, GERMANY.

JOURNALING OF SUPPORTING ROLLERS.

Application filed July 22, 1922, Serial No. 576,819, and in Germany August 22, 1921.

My invention has reference to the mounting of supporting rollers for heavy rotary drums and the like, and it is intended to provide means for a better distribution of forces than heretofore accomplished, and to generally improve the construction and arrangement of devices of the kind referred to.

Supporting rollers employed for supporting heavy rotating drums, such as are used for instance for roasting, sifting, drying or mixing purposes, should be mounted in such a manner that the axes of the rollers and of the drums are in parallel relation to each other. Unless this is done lateral thrusts are set up between the supporting rollers and the drum which will either result in the pushing away of the parts or in a straining of the contacting surfaces which are intended to prevent this pushing action.

There is the additional drawback resulting from the lateral thrust that the supporting surfaces at the roller and the drum are excessively strained by continuously acting sliding motion, and are gradually roughened.

The proper adjustment of the supporting rollers is difficult on account of the drums being frequently inaccessible at their front ends, and in view of their axes being partially inclined towards the horizontal. It requires a succession of time-consuming trials to arrive at an exactly coaxial adjustment of the supporting rollers for the drums. In many cases, in which deformations are caused by irregular heating or varying load, it is not sufficient to have the adjustment effected once only. In the case of drums supported by several rollers, such as for instance, by four or six rollers, the errors occurring in the adjustment are not always easily noticeable, because the thrust of one or several supporting rollers may be compensated by an approximately equal thrust of other rollers. The journaling as a whole in such cases appears to be in order, though there is an undesirably large consumption of power set up in the overstrained bearings and an excessive strain on the supporting surfaces.

In accordance with the invention about to be described the adjustment of the supporting rollers is effected automatically by providing means of allowing the rollers to rock until the proper position is automatically reached in a plane tangential to the supporting rollers at the point of support of the drum. By this means the necessity of the arrangement of special longitudinal bearings in the supporting rollers is obviated, so as to insure reduction of frictional contact and a decrease of wear on the supporting surfaces.

In the drawings affixed to this specification and forming part thereof, the invention is shown by way of example as embodied in a drum supporting device. In the drawings, Fig. 1 is an end view showing the lower part of the rotary drum and the supporting rollers.

Figure 1:
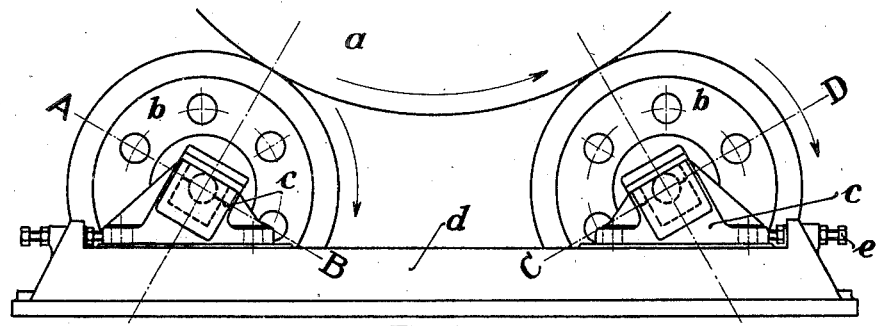

Referring to the drawings, Fig. 1 shows the drum $a$ as supported upon the supporting rollers $b$ which revolve in the inverse direction as the drum. The supporting rollers $b$ are carried in supporting brackets or cradles $c$ which are not rigidly secured to the base plate $d$, but are adapted to be displaced upon this base plate for the purpose of effecting an exact adjustment by screws $e$. The supporting rollers $b$ are moreover mounted on either side in two blocks $h$ or the like with open top and substantially similar to an open journal bearing, and which are movable in guides in the supports or cradles $c$, the guides being out of coaxial alinement, and forming an angle with each other, the apex of this angle is pointing in the direction of movement of the drum at the point of contact.

The supporting roller $b$ itself or the axis of the same is therefore free after a few oscillations to finally assume the correct position in a plane formed by the cavities of the supports. If the drum $a$ rotates in a truly circular path, the supporting rollers $b$ will by themselves assume the position in which the axes of the drums and of all of the supporting rollers are in parallel relation to each other. If the drum should happen to be oscillated in its longitudinal direction either by chance or intentionally, the supporting rollers in a short time will assume a more or less inclined position so that their axes constitute the generatrices of a rotation hyperboloid.

Figure 2:
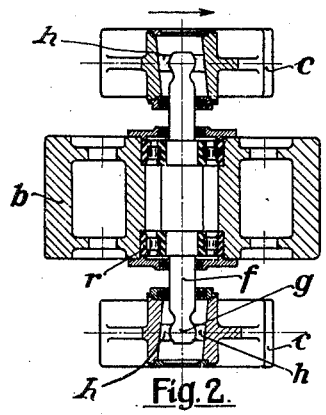
Fig. 2 is an axial section of a supporting roller and its bearings.

In the modification shown in Fig. 2 the supporting roller $b$ revolves on two roller bearings $r$ and about a stationary pivot $f$ the end faces of which are provided with globular journals $g$ adapted to effect slight oscillations in the sliding blocks $h$.

Figure 3:
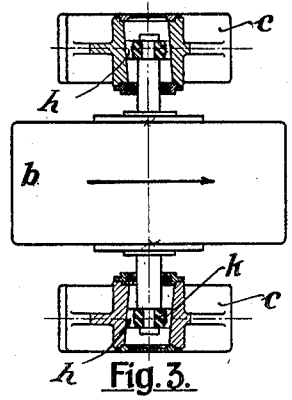
Fig. 3 illustrates in axial section a modified construction of the sliding and oscillating bearing for the supporting roller shown in plan view.

The modification disclosed in Fig. 3 differs from the one shown in Fig. 2 in that the globular journals $g$ are replaced by separate globular rings $k$.

Figures 4, 5:
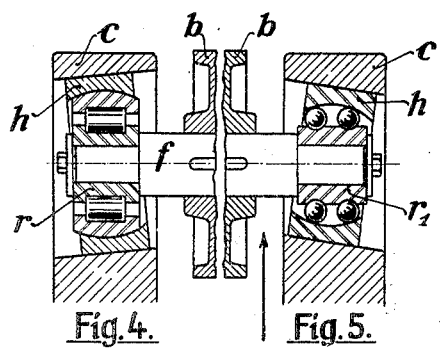
Figs. 4 to 6 are sectional views of other modifications of supporting rollers in sectional planes parallel to the contacting surface of the supporting roller and the drum.

In the modifications according to Figs. 4 and 5 the supporting roller $b$ is rigidly secured to the pivot $f$. At the ends of the pivotal stud or axle $f$ roller bearings $r$ (Fig. 4) or ball bearings $r'$ (Fig. 5) are mounted. The outer ring races of the roller bearings in Fig. 4 have spherical circumferential faces and are seated in hollow spherically shaped blocks $h$, while in Fig. 5 these blocks form the outer ring races for the balls.

Figure 6:
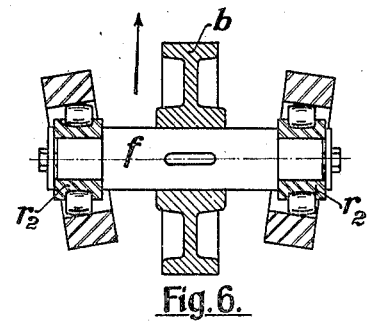

In the structure illustrated in Fig. 6 roller bearings $r^2$ are provided the rollers of which have their outer surfaces shaped in such a manner that, when the rollers are seated upon the inner ring race, their outer surfaces appear as being tangentially enveloped by an exterior sphere. Such rollers are not only adapted to revolve in cylindrically shaped outer races, but are also free to be displaced therein. The outer rings of the bearings according to Fig. 6 may, therefore, be formed as ordinary smooth cylindrical rings, which are retained in the supports $c$.

Various other modifications and embodiments besides those herein before described by way of example are possible in my invention which is applicable to a great variety of uses, and is susceptible of changes and modifications as will be required to suit the convenience of the user and to better adapt the invention to the various arts and kinds of machinery to which it is applicable.

I claim:

1. Antifrictional support for revoluble drums and the like comprising pairs of supporting rollers, guides wherein both ends of the roller axles are free to move substantially in axial direction, the axes of the said guiding means extending in a plane which is parallel to the tangent plane extending through the line of contact of said roller and said drum, the guiding means being so constructed that the axes of the rollers on which the drum bears will assume a parallel relationship to the axis of the drum upon said axial movement.

2. Antifrictional support for revoluble drums and the like comprising pairs of supporting rollers, guides wherein both ends of the roller axles are free to move substantially in axial direction, the axes of the said guiding means intersecting in front, referring to the direction of rotation of said drum, of the axes of rotation of said rollers in a plane extending parallel to the line of contact of said roller and said drum.

3. Antifrictional support for revoluble drums and the like comprising pairs of supporting rollers, guides wherein both ends of the roller axles are free to move substantially in axial direction, the axes of the said guiding means extending in a plane which is parallel to the tangent plane extending through the line of contact of said roller and said drum, and a block and revoluble antifrictional bodies inserted between each axle end and said guiding means.

4. Means for supporting a rotary drum comprising a pair of supporting rollers, the axles of which rollers are movably carried in guideways at opposite sides of said rollers, the axes of said guideways extending at an angle to each other and in a plane which extends in parallel to a plane which is tangential to said rollers and said drum along the line where each roller engages said drum.

5. Means for supporting a rotary drum comprising a pair of supporting rollers, the axles of which rollers are movably carried in guideways at opposite sides of said rollers, the axes of said guideways extending at an angle to each other, the vertex of said angle extending in the direction in which said drum is rotating, related to the line of engagement between said drum and each roller, said axes being in a plane which extends in parallel to a plane which is tangential to said rollers and said drum along the line where each roller engages said drum.

6. Means for supporting a rotary drum comprising a pair of supporting rollers, the axles of which rollers are movably carried in blocks of guideways through the medium of rotary parts, the axes of said guideways extending in a plane which extends in parallel to a plane which is tangential to said rollers and said drum along the line where each roller engages said drum.

In testimony whereof I affix my signature.

JOSEF KIRNER.